1

(12) United States Patent
Kobuchi et al.

(10) Patent No.: US 9,507,176 B2
(45) Date of Patent: Nov. 29, 2016

(54) POLARIZATION OPTICAL ARTICLE IN WHICH UNEVEN COLORING BY POLARIZATION COLOR HAS BEEN IMPROVED

(75) Inventors: Nobuyuki Kobuchi, Higashiosaka (JP); Keishi Yoshikawa, Higashiosaka (JP); Koichiro Oka, Higashiosaka (JP)

(73) Assignee: YAMAMOTO KOGAKU CO., LTD., Osaka (JP)

( * ) Notice: Subject to any disclaimer, the term of this patent is extended or adjusted under 35 U.S.C. 154(b) by 306 days.

(21) Appl. No.: 13/435,463

(22) Filed: Mar. 30, 2012

(65) Prior Publication Data

US 2012/0250142 A1    Oct. 4, 2012

(30) Foreign Application Priority Data

Apr. 1, 2011   (JP) ................. 2011-081411

(51) Int. Cl.
*G02F 1/00*   (2006.01)
*G02B 5/30*   (2006.01)
*G02C 7/12*   (2006.01)

(52) U.S. Cl.
CPC ............ *G02F 1/00* (2013.01); *G02B 5/3083* (2013.01); *G02C 7/12* (2013.01)

(58) Field of Classification Search
USPC .......... 359/321, 323, 301, 303, 304; 349/99, 349/102, 103
See application file for complete search history.

(56) References Cited

U.S. PATENT DOCUMENTS

| 5,956,145 A * | 9/1999 | Green et al. .................. 356/364 |
| 7,990,499 B2 * | 8/2011 | Ito et al. ........................ 349/108 |
| 2004/0246417 A1 * | 12/2004 | Matsushima ................. 349/114 |

FOREIGN PATENT DOCUMENTS

| JP | 08-052817 | | 2/1996 | |
| JP | 2663440 | | 6/1997 | |
| JP | 2000-206327 | * | 7/2000 | ............ G02B 5/30 |
| JP | 2002-258052 | | 9/2002 | |
| JP | 2007-233215 | | 9/2007 | |
| JP | 2007-525693 | | 9/2007 | |
| JP | 2010-039357 | | 2/2010 | |
| WO | 2004/098865 | | 11/2004 | |

* cited by examiner

*Primary Examiner* — Joseph P Martinez
*Assistant Examiner* — Brandi Thomas
(74) *Attorney, Agent, or Firm* — Wenderoth, Lind & Ponack, L.L.P.

(57) ABSTRACT

An object of the present invention is to improve uneven coloring by polarization color due to birefringence of a polarization optical article.
Disclosed is a polarization optical article in which uneven coloring by polarization color has been improved, the polarization optical article being a multi-layered polarization optical article including at least a linear polarization functional portion, a retardation functional portion and a back-up resin portion, characterized in that the linear polarization functional portion, the retardation functional portion and the back-up resin portion are arranged in order from an objective side toward an ocular side. The linear polarization functional portion is, for example, a linear polarizer, the retardation functional portion is, for example, a retardation sheet, and the retardation functional portion has, for example, a retardation of 1,000 nm or more. The back-up resin is a polycarbonate resin, a polyamide resin or the like.

14 Claims, No Drawings

POLARIZATION OPTICAL ARTICLE IN WHICH UNEVEN COLORING BY POLARIZATION COLOR HAS BEEN IMPROVED

BACKGROUND OF THE INVENTION

Field of the Invention

The present invention relates to an ophthalmic optical article which blocks light reflected off water, snow, glass and other surfaces to reduce glare by a polarizing function, and more particularly to a polarization optical article in which uneven coloring by polarization color has been improved, which is used as polarization sunglasses, polarizing correcting glasses, polarizing goggles, polarizing shields and the like.

Description of the Related Art

The basis of polarizing performances of a polarization optical article lies in a polarizer. Ordinary polarizer is a uniaxially stretched resin sheet doped with iodine or a dichroic dye (JP-B 2,663,440).

In the polarizer, an absorption axis and a transmission axis are defined with respect to a vibration direction of a light wave. Usually, a stretching direction of a uniaxially stretched resin sheet corresponds to an absorption axis, and the direction perpendicular to the absorption axis, namely the direction perpendicular to the stretching direction corresponds to a transmission axis.

The light wave of sunlight or a fluorescent lamp vibrates in any direction, the full 360 degrees. When this light wave is applied to a polarizer, a light wave component in an absorption axis direction is absorbed to the polarizer to cause a selective phenomenon in which the light wave component in a transmission axis direction penetrates. As a result, the light wave penetrated the polarizer is unified to only the component in a transmission axis direction. The polarizer having the polarization degree of 100% means that the entire (100%) light wave component in an absorption axis direction is absorbed and the entire (100%) light wave component in a transmission axis direction penetrates.

In addition to the uniaxially stretched resin sheet, a polarizer of a coating film molecular-oriented in a uniaxial direction also exists. However, the polarization principle is the same, and also physical brittleness is common because of a thin film. A description will be made below by way of a uniaxially stretched resin sheet as a typical example of a polarizer.

The uniaxially stretched resin sheet to be used as the polarizer is a thin film having a thickness of about several tens of μm and is very brittle, and thus it is difficult to use the polarizer alone as a polarization optical article, for example, sunglasses. Therefore, physical strength is increased by reinforcement through coating or laminating at least one side of the polarizer with the other resin layer. This reinforcing resin portion is called a protective sheet or a back-up resin portion.

The back-up resin portion is produced by injection molding (JP-A 8-52817) or cast molding (JP-A 2008-281791). However, there arose a new problem such as uneven coloring by polarization color caused by the back-up resin portion.

In order to make the description easier to understand, a description will be mainly made by way of the case of a polarizing lens.

In case of observing the polarizing lens in a state where another polarizer is laid on a back-up resin side of the polarizing lens thereby setting to a crossed nicols state, a phenomenon of separation into red, green and blue colors is observed in most cases. In the present invention, this color separation phenomenon is referred to as uneven coloring by polarization color. This uneven coloring by polarization color is called a polarization color due to birefringence.

Here are two kinds of reasons to consider, for uneven coloring by polarization color (hereinafter referred to as "uneven polarization coloring"), from the viewpoint of origin. One of them is uneven polarization coloring based on local molecular orientation formed in case of injection molding or extrusion molding of a back-up resin portion. This is referred to as uneven polarization coloring due to orientation birefringence.

The local molecular orientation appears at various positions of a plastic solid while varying the generation amount, size and direction depending on the molding conditions (molding temperature, molding rate, mold temperature, etc.), mold conditions (gate position, shape of mold, etc.) and the like. As a result, a local difference arises in orientation birefringence, which is called optical strain due to orientation birefringence, thus detecting as uneven polarization coloring.

The optical strain and uneven polarization coloring orientation due to orientation birefringence also appears in the polarizing lens, and an ordinary lens other than the polarizing lens in case of injection molding or extrusion molding of polycarbonate, PMMA, and a thermoplastic resin such as transparent nylon (JP-A 2002-187931).

However, the polarizing lens and ordinary lens differ in the observation method. Namely, in case of the polarizing lens, one polarizer is laid on a back-up side thereby setting to a crossed nicols state. In contrast, in case of the ordinary lens, the lens is interposed between two polarizers thereby setting to a crossed nicols state. If optical strain due to orientation birefringence exists, it can be detected as uneven polarization coloring.

In order to reduce uneven polarization coloring due to orientation birefringence, it is necessary to device a way based on molding conditions. Any method is a method of mitigating local molecular orientation caused by molding, and a decrease in injection molding rate and extrusion molding rate, a decrease in cooling rate of a mold and compression injection molding are required, and thus it is impossible to avoid drastic decrease in productivity, leading to an increase in costs.

There exists the technology in which already existing uneven polarization coloring due to orientation birefringence is reduced by orientational relaxation through an annealing treatment. However, heat deformation of the lens may occur concurrently with orientational relaxation in a thermoplastic resin.

In case of cast molding of a back-up resin portion, molecular orientation is less likely to occur during molding as a feature of a cast molding method. Accordingly, orientation birefringence is less likely to occur in the back-up resin portion, and thus optical strain and uneven polarization coloring due to orientation birefringence are less likely to occur.

In addition to uneven polarization coloring due to orientation birefringence, another kind of uneven polarization coloring exists. It is called uneven polarization coloring caused by optical strain due to photoelastic birefringence (hereinafter referred to as uneven polarization coloring due to photoelastic birefringence).

Uneven polarization coloring due to photoelastic birefringence is neither optical strain nor uneven polarization coloring, which originally exists in the back-up resin portion.

For example, when the polarizing lens is mounted in a frame, the polarizing lens undergoes microdeformation due to a pressure of the frame which fastens the lens. The above-mentioned uneven polarization coloring due to photoelastic birefringence is acquired optical strain or uneven polarization coloring associated with the microdeformation. The method for observation of uneven polarization coloring due to photoelastic birefringence is the same as the method for observation of uneven polarization coloring due to orientation birefringence.

Optical strain due to orientation birefringence is optical strain involved in orientation properties (degree of orientation, direction, strain) of a main chain of resin molecules. In contrast, optical strain due to photoelastic birefringence is said to be optical strain involved in strain of a side chain of resin molecule. For example, in case of mounting in a frame, optical strain can be reduced or removed when a fastening pressure of the frame is decreased or the pressure applied to the lens are made uniform.

Optical strain and uneven polarization coloring due to photoelastic birefringence are generated regardless of the kind of the back-up resin and the molding method. Namely, even if the back-up resin portion is an extrusion-molded resin, an injection-molded resin, or a cast-molded resin, they are generated in any resin.

Well, is such optical strain due to orientation birefringence and photoelastic birefringence harmful to persons who wear eyeglasses?

Very interestingly, the injection-molded correcting lens made of polycarbonate, namely filled with optical strain due to orientation birefringence are now spread in the United States (a share will probably account for 50% or more of the whole correcting lens in the United States). If such optical strain due to orientation birefringence is harmful to the human eyes, the propagation of the correcting lens made of polycarbonate could not be achieved in the United States.

In the world, most of the correcting lenses made of plastic are oppupyed by cast-molded lenses (typical examples include CR39 lens). Upon observation of the cast-molded lens mounted in a glass frame in a crossed nicols state, uneven polarization coloring due to photoelastic optical strain is observed in most of lenses.

Taking the propagation of the correcting lens made of polycarbonate in the United States and grovel propagation of the cast-molded correcting lens into consideration, both optical strain due to orientation birefringence and optical strain due to photoelastic birefringence are considered to be substantially harmless to the human eyes.

Even if such optical strain due to birefringence is harmless, optical strain due to birefringence can be easily detected as uneven polarization coloring by setting two polarizers into a crossed nicols state.

SUMMARY OF THE INVENTION

For example, in the polarizing lens produced by an injection molding method, typical to the polarizing lens made of polycarbonate, optical strain and uneven polarization coloring due to orientation birefringence are observed.

The correcting lens made of polycarbonate produced by the injection molding method is used in the United Stated in a state where such optical strain exists.

Also in the correcting lens produced by the cast molding method, which is free from optical strain due to orientation birefringence, it is often used in a state where photoelastic optical strain due to photoelastic birefringence exists when mounted once in a frame.

It is not considered that optical strain due to orientation birefringence and photoelastic birefringence exerts an adverse influence on the health of human eyes. However, optical strain can be observed as uneven polarization coloring by setting a polarizer into a crossed nicols state if the observation would be tried. Such uneven polarization coloring is not a problem belonging to lens performances from categorical point of view.

Nevertheless, some manufacturers of the polarizing lens produced by the cast molding method sometimes point out uneven polarization coloring of the polarizing lens produced by the injection molding method as if it was significant poor performance.

Specifically, they emphasize uneven polarization coloring due to orientation birefringence of the polarizing lens produced by the injection molding method in the form of poor image in business brochures and trade journals.

The same shall apply to retail shops of eyeglasses such as sunglasses. Customers, who are allowed to have a look of uneven polarization coloring of the polarizing lens made of polycarbonate in a crossed nicols state by a shop keeper, might snap at the polarizing lens produced by the cast molding method, which is free from uneven polarization coloring. As a result, customers suffer the disadvantages that result from losing a chance of selecting the polarizing lens made of polycarbonate, which has unprecedented toughness and a noticeable effect of protecting eyes.

When the polarizing lens produced by the cast molding method is mounted in a glass frame, optical strain and uneven polarization coloring due to photoelastic birefringence are generated.

If possible, the visibility of uneven polarization coloring due to orientation birefringence and uneven polarization coloring due to photoelastic birefringence of the polarizing lens may be reduced. As a result of intensive study on an improvement in uneven polarization coloring due to birefringence of a polarization optical article, the present invention has been completed.

In order to achieve the above-mentioned problems, the following means have been invented.

First, the gist of the present invention lies in a polarization optical article in which uneven polarization coloring has been improved, the polarization optical article being a multi-layered polarization optical article including at least a linear polarization functional portion, a retardation functional portion and a back-up resin portion, characterized in that the linear polarization functional portion, the retardation functional portion and the back-up resin portion are arranged in order from an objective side toward an ocular side.

The gist further lies in the polarization optical article in which uneven polarization coloring has been improved, wherein the linear polarization functional portion and the retardation functional portion are arranged so that an absorption axis direction of the linear polarization functional portion and a delayed phase axis direction of the retardation functional portion form an angle of 45°±20° or less.

The gist further lies in the polarization optical article in which uneven polarization coloring has been improved, wherein the linear polarization functional portion is a linear polarizer.

The gist further lies in the polarization optical article in which uneven polarization coloring has been improved, wherein the linear polarization functional portion is a multi-layered polarizing plate composed of a linear polarizer and a linear polarizer protective functional portion.

The gist further lies in the polarization optical article in which uneven polarization coloring has been improved, wherein the protective functional portion of the ocular side of the polarizing plate is a retardation functional portion.

The gist further lies in the polarization optical article in which uneven polarization coloring has been improved, wherein the retardation functional portion is a retardation sheet.

The gist further lies in the polarization optical article in which uneven polarization coloring has been improved, wherein the retardation functional portion is a multi-layered retardation plate composed of a retardation sheet and a retardation sheet protective functional portion.

The gist further lies in the polarization optical article in which uneven polarization coloring has been improved, wherein the retardation functional portion has a retardation of 1,000 nm or more.

The gist further lies in a polarization optical article in which uneven polarization coloring has been improved, characterized in that a linear polarization functional portion and a retardation functional portion form a laminated body, and a back-up resin portion is arranged while being bonded to a retardation function side of the laminated body.

The gist further lies in a polarization optical article in which uneven polarization coloring has been improved, characterized in that a linear polarization functional portion, a retardation functional portion and a bonding sheet form a laminated body from an objective side toward an ocular side, and a back-up resin portion is arranged while being bonded to a bonding sheet side of the laminated body.

The gist further lies in the polarization optical article in which uneven polarization coloring has been improved, wherein the back-up resin portion is subjected to insert injection molding or insert cast molding.

The gist further lies in the polarization optical article in which uneven polarization coloring has been improved, wherein the back-up resin portion is a lens-shaped plastic solid produced by bending an extrusion molded sheet or a cast molded sheet, or a lens-shaped plastic solid produced by injection molding or cast molding.

The gist further lies in the polarization optical article in which uneven polarization coloring has been improved, wherein the back-up resin portion is adhesive-bonded or heat-bonded to a retardation function side or a bonding sheet side of a laminated body.

The gist further lies in the polarization optical article in which uneven polarization coloring has been improved, wherein the back-up resin portion is any one of a polycarbonate resin, a polyamide resin, a polyester resin, a polyacrylic resin, a polycycloolefin resin and a polyurethane resin.

The gist further lies in the polarization optical article in which uneven polarization coloring has been improved, wherein the back-up resin portion is an insert-injection molded polycarbonate resin or a lens-shaped plastic solid made of polycarbonate, and the retardation functional portion has a retardation of 8,000 nm or more.

The gist further lies in the polarization optical article in which uneven polarization coloring has been improved, wherein the back-up resin portion is an insert-cast molded or cast-molded diethylene glycol diallyl carbonate resin (CR39), thiourethane resin, episulphide resin, polyurethane resin or acrylic resin.

DETAILED DESCRIPTION OF THE INVENTION

The polarization optical article in which uneven polarization coloring has been improved of the present invention has, as basic components, a linear polarization functional portion, a retardation functional portion and a back-up resin portion.

Description of Linear Polarization Functional Portion

The basis of a linear polarization functional portion lies in a linear polarizer. The linear polarizer is usually a uniform resin sheet having a thickness of 0.1 mm or less. Quite commonly, it is a uniaxially stretched sheet of a straight-chain resin such as polyvinyl alcohol or polyethylene terephthalate.

In order to obtain high polarization degree, a linear polarizer prepared by a uniaxially stretching method, in which a resin sheet doped with iodine or a dichroic dye is uniaxially stretched with a high stretching ratio of about 2 to 5 times, is commonly used.

The iodine doping method using iodine has a feature that it is easy to obtain high polarization as compared with a dye doping method using a dye, but has a drawback such as poor heat resistance because of using iodine which is likely to undergo sublimation. On the other hand, the dye doping method enables higher heat resistance than that of the iodine doping method, but has a problem that the polarization degree varies depending on the dye or color hue.

There has been known, as the linear polarizer, a linear polarizer produced by a coating method, to the above-mentioned linear polarizer produced by a uniaxially stretching method. According to this method, a linear polarizer is produced by spin-coating a solution containing a liquid crystal compound or a liquid crystal resin thereby orienting a liquid crystal portion in a uniaxial direction, or performing radical polymerization so as to orient in a uniaxial direction by polarized ultraviolet rays after coating.

As mentioned below, the linear polarizer produced by the uniaxially stretching method may be used in the form of one sheet without being particularly reinforced in case of forming a back-up resin portion by a cast molding method.

However, since the linear polarizer produced by the uniaxially stretching method is likely to be fibrillated in a stretching direction and has poor resistance to a change in temperature and humidity, and also scratches easily, the linear polarizer is generally used in combination with a linear polarizer protective functional portion which protects the linear polarizer.

The linear polarizer protective functional portion is formed by laminating a protective sheet on surface or both surfaces of the linear polarizer. The linear polarizer with the linear polarizer protective functional portion is commonly called a polarizing plate, and a laminate form thereof is commonly either (protective sheet-linear polarizer) or (protective sheet-linear polarizer-protective sheet).

The protective sheet is often produced by an extrusion molding method or a cast molding method.

Examples of the protective sheet produced by the extrusion molding method include sheets of transparent thermoplastic resins such as a polycarbonate resin, a polyamide resin, a polyester resin, a polyurethane resin, a polyacrylic resin, a polycycloolefin resin, a polystyrene resin, a polyvinyl chloride resin, a polystyrene-methyl methacrylate resin, a polyacrylonitrile-styrene resin, a poly-4-methylpentene-1 resin, and an acylcellulose resin containing a plasticizer added therein, and the protective sheet may be subjected to uniaxial stretching or biaxial stretching.

Examples of particularly preferred transparent thermoplastic resin include a polycarbonate resin, a polyamide resin, a polyester resin, a polyurethane resin, a polyacrylic resin and a polycycloolefin resin from the viewpoint of ease of extrusion molding, high transparency and high water resistance.

Stabilizers such as an ultraviolet absorber and an antioxidant are often added to these resins.

The polycarbonate resin is preferably an aromatic polycarbonate resin mainly composed of aromatic phenols, such as bisphenol A, or a polymer alloy of an aromatic polycarbonate resin and a polyester resin, from the viewpoint of increasing the physical strength of the linear polarizing plate.

Among these polycarbonate resins, a bisphenol A-based polycarbonate resin is preferable, and a resin having a viscosity average molecular weight of 15,000 or more, and preferably 18,000 or more, is excellent from the viewpoint of enhancing the strength and toughness of the polarizing plate.

The polyamide resin is preferably a polyamide resin which has high hardness and strength as well as strong toughness, and is amorphous and also has high transparency, among polyamides obtained by polycondensing an alicyclic or aliphatic dicarboxylic acid and an alicyclic or aliphatic diamine as main components.

Because of necessity of particularly high transparency, a polyamide called an amorphous nylon or transparent nylon is preferably used. Typical examples thereof include "GRILAMID" TR-55 and "GRILAMID" TR-90 manufactured by EMS CHMEMIE Holding, "TROGAMID" CX-7323 manufactured by HULS, and those analogous thereto.

The transparent nylon commonly has a feature such as lesser optical strain due to orientation birefringence as compared with the polycarbonate resin. The transparent nylon may also have higher solvent resistance such as solvent crack resistance as compared with the polycarbonate resin.

A polyester resin having high hardness and strength, strong toughness and excellent transparency is preferably used among polyester resins containing, as a main component, an aromatic dicarboxylic acid such as terephthalic acid.

A polyurethane resin which has high hardness, strength and strong toughness, and is less likely to cause crystallization, is preferably used among polyurethane resins containing, as a diisocyanate component, an aromatic diisocyanate or an alicyclic diisocyanate.

Examples of preferable polyurethane resin include polyester-based polyurethanes "ELASTOLLAN" ET590, "ELASTOLLAN" ET595 and "ELASTOLLAN" ET598 manufactured by BASF, polyether-based polyurethanes manufactured by the same company, and resins analogous thereto.

As the polyacrylic resin, methacrylate-based polymers such as methyl methacrylate and cyclohexyl methacrylate, an acrylic resin including a copolymer, and resins analogous thereto are preferably exemplified from the viewpoint of hardness, strength and transparency.

The polycycloolefin resin generally has a feature such as small birefringence, and it is easy to obtain a sheet with less optical strain. Typical examples of the cycloolefin resin (and the cycloolefin copolymerized resin) include "ZEONEX" and "ZEONOR" of Zeon Corporation, "ARTON" of JSR Corporation, "OPTOREZ" of Hitachi Kasei Polymer Co., Ltd., "APEL" of Mitsui Chemicals, Inc., "ESSINA" of Sekisui Chemical Company, Limited, and resins analogous thereto.

Examples of the protective sheet produced by the cast molding method include protective sheet made of an acylcellulose resin, a polycycloolefin resin, an acrylic resin, a polyurethane resin and the like, and the protective sheet commonly has a feature such as small optical strain due to orientation birefringence.

Typical examples of the method of producing a protective sheet produced by the cast molding method include a solution casting method and a method of polymerization between plates.

Typical examples of the protective sheet produced by the solution casting method include an acylcellulose sheet. Acylcelluloses such as triacetylcellulose (TAC), diacetylcellulose, tripropylcellulose and dipropylcellulose are dissolved in acetone or methylene chloride to prepare a solution, and then the solution is formed into a belt or a drum by flow casting and the solvent is removed by a heating or vacuum treatment to obtain a sheet. Also, the polycycloolefin resin may be formed into a sheet by a solution casting method.

Typical examples of the method of polymerization between plates include a method in which (meth)acrylates composed mainly of methyl methacrylate and urethane acrylate are filled into a space between two parallel glass plates in a sealed state, and then performing thermal polymerization or electromagnetic radiation polymerization to obtain an acrylic resin sheet.

In addition, the polyurethane resin sheet may be also produced by a method of polymerization between plates. The polyurethane resin sheet produced by the polymerization between plates is produced by mixing aromatic polyisocyanates and hexamethylene diisocyanates, such as tolylene diisocyanate (TDI), metaxylene diisocyanate (MDI) and diphenylmethane-4,4'-diisocyanate, and aliphatic polyisocyanates such as isophorone diisocyanate with polyols, for example, aliphatic glycols such as ethylene glycol and 1,3-propane glycol, polyether-based glycols such as polyethylene glycol and polypropylene glycol, and polyester-based glycols such as caprolactone-based and adipate-based glycols; and filling the mixture into the space between plates; followed by thermal polymerization.

A compound capable of forming a resin by reacting with an isocyanate such as amine can be used in place of polyols.

The protective sheet produced by the cast molding method is preferably a sheet whose industrial production technology has already established, and examples thereof include a triacetylcellulose (TAC) sheet and a polycycloolefin resin sheet produced by a solution casting method, and a polyacrylic resin sheet produced by a method of polymerization between plates.

Stabilizers such as an ultraviolet absorber and an antioxidant are often added to these resins.

The thickness of the protective sheet is preferably from about 0.01 to 1.0 mm, and more preferably from about 0.02 to 0.8 mm, regardless of the production method. When the thickness is less than 0.01 mm, insufficient effect of protecting a linear polarizer is exerted. It is not preferred that the thickness is more than 1.0 mm since an appearance-related problem such as too thick polarization optical article may sometime arise.

In case of a polarizing plate produced by sandwiching a linear polarizer between two protective sheets, it is not necessary that kinds of resins, sheet molding methods, stretching ratios, thicknesses of sheets and the like of the respective protective sheets are the same.

Although the protective sheet produced by the cast molding method commonly has less molecular orientation properties, the protective sheet produced by the extrusion molding method, especially stretched sheet has molecular orientation properties and thus it becomes necessary to unify the stretching direction in case of sticking a linear polarizer and a protective sheet with each other.

Particularly, in the protective sheet produced by the extrusion molding method at the objective side, since the sheet having molecular orientation properties is useful to suppress unevenness in polarization degree and uneven polarization coloring, the sheet is preferably stretched. Nearly matching of the stretching direction (or absorption axis) of the linear polarizer and the stretching direction (or delayed phase axis) of the protective sheet at the objective side is useful to suppress a decrease in polarization degree as well as unevenness in polarization degree and uneven polarization coloring. When the protective sheet at the objective side is a biaxially stretched protective sheet, it is preferred to nearly match the stretching direction (or delayed phase axis) of the linear polarizer with a larger stretching ratio to the stretching direction (absorption axis) of the linear polarizer.

In case of the protective sheet such as a polystyrene or PMMA sheet in which the stretching direction is not a delayed phase axis but a phase leading axis, it is preferred to reverse the stretching direction.

The linear polarizer of the polarizing plate and the protective sheet are commonly stuck with each other using an adhesive or a pressure-sensitive adhesive. It is necessary for the adhesive or pressure-sensitive adhesive to have long-term durability against water, heat, light and the like. Examples of the adhesive include an isocyanate compound, a polyurethane resin, a polythiourethane resin, an epoxy resin, a vinyl acetate resin, an acrylic resin, a wax and the like. Examples of the pressure-sensitive adhesive include a vinyl acetate resin, an acrylic resin and the like.

The thickness of the adhesive layer or pressure-sensitive adhesive layer is usually from 0.1 to 100 µm, and preferably from 0.5 to 80 µm. When the thickness of the adhesive layer or pressure-sensitive adhesive layer is less than 0.1 µm, low bonding force is exerted. When the thickness is more than 100 µm, the adhesive or pressure-sensitive adhesive may ooze out from the end surface of the polarizing plate.

The thickness of the polarizing plate is preferably from 0.1 to 3 mm, and more preferably from 0.2 to 2.6 mm. It is difficult to produce a polarizing plate when the thickness is less than 1 mm. It is not preferred that the thickness is more than 3 mm since an appearance-related problem such as too thick polarization optical article may sometime arise.

Typical examples of the polarizing plate include laminate structures of (polycarbonate protective sheet-linear polarizer), (polycarbonate protective sheet-linear polarizer-polycarbonate protective sheet), (TAC protective sheet-linear polarizer) and (TAC protective sheet-linear polarizer-TAC protective sheet).

Regarding the linear polarizer produced by the coating method, the protective sheet similar to the above-mentioned protective sheet may be laminated, if necessary.

Description of Retardation Functional Portion

The common form of the retardation functional portion is a retardation sheet made of a resin. Examples of the common resin to be used in the retardation sheet include a polycarbonate resin, a polyvinyl alcohol resin, a polycycloolefin resin, a polyamide resin, a polyester resin, an acrylic resin, an acetylcellulose resin, a liquid crystal polymer such as polyallylate, a polysulfone resin and the like.

A dichroic dye to be used in producing a polarizer, and a retardation developing agent as described in JP-A 2010-215878 may be added to these resins. Stabilizers such as an ultraviolet absorber and an antioxidant may be added to these resins.

The retardation sheet is usually a sheet obtained by stretching an extrusion-molded sheet in a uniaxial or biaxial direction.

The stretching ratio of the retardation sheet should be determined by the degree of a retardation (retardation) to be determined, and higher retardation is commonly obtained as the stretching ratio increases.

In almost linear polymer compounds, a refractive index in a main chain direction is different from that in a direction perpendicular to the main chain direction. The birefringence $\Delta N$ is defined by the formula (1):

$$\Delta N = N_x - N_y \quad (1)$$

wherein $N_x$ denotes a refractive index in a stretching direction (usually corresponding to a delayed phase axis direction), namely a main chain direction of a retardation sheet, and $N_y$ denotes a refractive index of a direction (usually corresponding to a phase leading axis direction) perpendicular to the stretching direction.

When the linear polarizer and the retardation sheet are stuck with each other in a state where an angle of 45° is formed between the respective stretching directions, linear polarized light incident on the retardation sheet from the linear polarizer is decomposed again into a light wave in a delayed phase axis direction and a light wave in a phase leading axis direction by the retardation sheet, and thus a difference between a refractive index in a delayed phase axis direction and a refractive index in a phase leading axis direction brings a difference in propagation rate to each light wave.

As a result, a phase between the light wave in a delayed phase axis direction and the light wave in a phase leading axis direction shifts and thus a linear polarizer, which penetrated the retardation sheet, becomes circularly polarized light or elliptically polarized light. The amount of shift of the phase, which is represented by the length (distance) is retardation (which means retardation in a thickness direction of a retardation sheet).

The retardation R [nm] becomes a product of birefringence $\Delta N$ and a thickness d [nm] of a retardation sheet, and is represented by the formula (2).

$$R = \Delta N \times d \quad (2)$$

In the present invention, the retardation R of the retardation sheet, which is at least 1,000 nm or more and 5,000 nm or more, enhances the effect of reducing the visibility of uneven polarization coloring. When the retardation R is less than 1,000 nm, the effect of reducing the visibility of uneven polarization coloring due to orientation birefringence and uneven polarization coloring due to photoelastic birefringence, which arises in a polarization optical article, is reduced.

The bigger the retardation R is, the more, the effect of reducing the visibility of uneven polarization coloring due to orientation birefringence and uneven polarization coloring due to photoelastic birefringence, which arises in a polarization optical article, is enhanced. However, it becomes difficult to measure high retardation, resulting in difficulty in determination of the upper limit of the retardation R.

Herein, the upper limit of the retardation R is replaced by the polarization degree P defined in the formula (3) and the upper limit of the polarization degree of the retardation sheet is set to 5% or less, and preferably 3% or less. When the polarization degree of the retardation sheet is more than 5%, the effect of reducing the visibility of uneven polarization coloring due to orientation birefringence and uneven polarization coloring due to photoelastic birefringence, which arises in a polarization optical article, is reduced.

$$P=(I_{max}-I_{min})^{1/2}/(I_{max}+I_{min})^{1/2} \qquad (3)$$

where $I_{max}$ denotes a visible light transmittance measured using two measurement samples cut out from the same retardation sheet in a state where delayed phase axes are laid one upon another in parallel, and $I_{min}$ denotes a visible light transmittance measured in a state where a delayed phase axis and a phase leading axis are laid one upon another at right angles.

When retardation sheets are laminate in the same stretching direction, the retardation R can be added, based on the principal of the formula (2) relating to the retardation. Therefore, it is possible to increase the retardation R of the retardation functional portion by lamination of the retardation sheets.

The thickness of the retardation sheet is from about 0.005 to 2.0 mm, and more preferably from about 0.02 to 1.5 mm. When the thickness is less than 0.005 mm, it is difficult to produce a polarizing plate. It is not preferred that the thickness is more than 2.0 mm since an appearance-related problem such as too thick polarization optical article may sometime arise.

However, the thickness of more than 2 mm does not bring any obstacle in the reduction of uneven polarization coloring. In that regard, there is no upper limit on thickness of the retardation sheet.

The thickness of the retardation sheet should be determined by the degree of the retardation R to be determined.

The retardation functional portion may be a laminate in which a protective sheet is laminated on one surface or both surfaces of a retardation sheet, namely a retardation plate. The sheet to be used as the protective sheet of the retardation plate is preferably a resin sheet with less uneven polarization coloring due to orientation birefringence, such as a sheet made of triacetylcellulose (TAC), polymethyl methacrylate (PMMA) and cycloolefin resin, and a sheet having a thickness of about 0.01 to 1.0 mm is laminated and stuck using an adhesive or a pressure-sensitive adhesive.

It is difficult to produce a polarizing plate when the thickness is less than 0.01 mm. It is less preferred that the thickness is more than 1.0 mm since an appearance-related problem such as too thick polarization optical article may sometime arise.

It is necessary for the adhesive or pressure-sensitive adhesive to be used herein to have long-term durability against water, heat, light and the like. Examples of the adhesive include a polyurethane resin, a polythiourethane resin, an epoxy resin, a vinyl acetate resin, an acrylic resin, a wax and the like. Examples of the pressure-sensitive adhesive include a vinyl acetate resin, an acrylic resin and the like.

A retardation film produced by the coating method is also known for the retardation sheet. The retardation film produced by the coating method is a retardation film which is produced by spin-coating a solution containing a liquid crystal compound, a liquid crystal resin or a resin having large birefringence thereby orienting a compound or resin moelcules in a uniaxial direction, or performing radical polymerization so as to orient in a uniaxial direction by polarized ultraviolet rays after coating. The same protective sheet as mentioned above is optionally laminated to these retardation films.

Arrangement Angle of Linear Polarization Functional Portion and Retardation Functional Portion In order to achieve the present invention, it is required that the linear polarization functional portion and the retardation functional portion are arranged so that an absorption axis direction of the linear polarization functional portion and a delayed phase axis direction of the retardation functional portion forms an angle of 45°±20° or less, preferably 45°±10° or less, and more preferably 45°±5° or less.

When the angle formed by an absorption axis direction of the linear polarization functional portion and a delayed phase axis direction of the retardation functional portion is more than 45°±20°, the effect of reducing the visibility of uneven polarization coloring due to orientation birefringence and uneven polarization coloring due to photoelastic birefringence, which arises in a polarization optical article, is reduced.

Configuration examples of the laminated body of a linear polarization functional portion and retardation functional portion, which is suitably used in the present invention, include:
(linear polarizer-retardation sheet),
(linear polarizer-protective sheet-retardation sheet),
(linear polarizer-protective sheet-retardation sheet-protective sheet),
(linear polarizer-protective sheet-protective sheet-retardation sheet),
(linear polarizer-protective sheet-protective sheet-retardation sheet-protective sheet),
(protective sheet-linear polarizer-retardation sheet),
(protective sheet-linear polarizer-protective sheet-retardation sheet),
(protective sheet-linear polarizer-protective sheet-retardation sheet-protective sheet),
(protective sheet-linear polarizer-protective sheet-protective sheet-retardation sheet), and
(protective sheet-linear polarizer-protective sheet-protective sheet-retardation sheet-protective sheet).

The linear polarization functional portion and the retardation functional portion are generally laminated and stuck using an adhesive or a pressure-sensitive adhesive.

It is necessary for the adhesive or pressure-sensitive adhesive to be used herein to have long-term durability against water, heat, light and the like. Examples of the adhesive include an isocyanate compound, a polyurethane resin, a polythiourethane resin, an epoxy resin, a vinyl acetate resin, an acrylic resin, a wax and the like. Examples of the pressure-sensitive adhesive include a vinyl acetate resin, an acrylic resin and the like.

The reason why the visibility of uneven polarization coloring due to orientation birefringence and photoelastic birefringence is reduced by the present invention is unclear. However, it is considered that polarization color per se may become light as the retardation increases.

Furthermore, it is considered that the retardation of the retardation sheet increases far more than birefringence unevenness of a back-up resin portion and a protective sheet, which can cause uneven polarization coloring, and retardation unevenness having the same meaning as that of birefringence unevenness, and the visibility of the existence of retardation unevenness, which arose in the back-up resin portion or protective sheet, is reduced by the retardation of the retardation sheet, which is far larger than the retardation unevenness.

Description of Bonding Sheet

The polarization optical article of the present invention is further composed of a back-up resin portion, in addition to a linear polarization functional portion and a retardation functional portion. The back-up resin portion includes the retardation functional portion interposed therein, and is arranged at the opposite side of the linear polarization functional portion.

The retardation functional portion and the back-up resin portion must be integrally bonded by some method.

The integrally bonding method includes, for example, a method in which a back-up resin is injection-molded to a retardation functional portion by an insert injection molding method and a back-up resin portion is heat-bonded to the retardation function portion (referred to as an insert injection molding method).

The method also includes a method in which a monomer for cast molding is filled in a mold for cast molding charged with a retardation functional portion, and then the retardation functional portion and a back-up resin portion are bonded by polymerization such as thermal polymerization or electromagnetic radiation (referred to as an insert cast molding method).

The method also includes a method in which a back-up resin portion formed into a sheet in advance in a separate step is stuck to a retardation functional portion using an adhesive or a pressure-sensitive adhesive (referred to as a sticking method of a flat plate). In the sticking method of a flat plate, the product is formed into a lens by bending after sticking.

The method also includes a method in which a back-up resin portion formed into a sheet in advance in a separate step is formed into a lens-shaped plastic solid by bending, or a lens-shaped plastic solid formed in advance in a separate step is stuck to a retardation functional portion using an adhesive or a pressure-sensitive adhesive (referred to as a sticking method of a lens-shaped plastic solid).

The sticking method of a flat plate and the sticking method of a lens-shaped plastic solid may be collectively called a sticking method.

The sticking method causes less problem relating to integral bonding unless an adhesive or a pressure-sensitive adhesive is selected by mistake. However, it may be uneasy to integrally bond by an insert injection molding method and an insert cast molding method. In that case, it is possible to use a method in which a bonding sheet having a function capable of bonding both a retardation functional portion and a back-up resin portion is inserted therebetween.

In case of the insert injection molding method, a bonding sheet is preferably laminated and stuck to a retardation functional portion in advance. Since the bonding sheet requires heat-bonding compatibility with the back-up resin, the sheet is preferably made of a resin based on chemically the same material. Alternatively, the material is preferably a polyurethane resin which exhibits high bondability with a lot of resins.

The thickness of the bonding sheet is preferably from about 0.01 to 1.0 mm. When thickness of the bonding sheet is less than 0.01 mm, it is difficult to produce and also a heat bonding force is inferior. It is not preferred that the thickness is more than 1.0 mm since an appearance-related problem such as too thick polarization optical article may sometime arise.

The bonding sheet is laminated and stuck to a retardation functional portion through an adhesive or a pressure-sensitive adhesive. It is necessary for the adhesive or pressure-sensitive adhesive to be used to have long-term durability against water, heat, light and the like. When a back-up resin is cast-molded, it is necessary that the resin does not dissolve in a monomer for cast molding.

Examples of the adhesive include a polyurethane resin, a polythiourethane resin, an epoxy resin, a vinyl acetate resin, an acrylic resin, a wax and the like. Examples of the pressure-sensitive adhesive include a vinyl acetate resin, an acrylic resin and the like.

In case of an insert cast molding method, since it is necessary for a bonding sheet to bond with a back-up resin through polymerization, the sheet preferably has high chemical affinity with a monomer for cast molding.

It is preferred that the bonding sheet is chemically bonded with a monomer for cast molding. Alternatively, the bonding sheet is preferably a bonding sheet which has a property which enables easy impregnation with a monomer for cast molding and easy exertion of a so-called anchor effect.

Examples of typical bonding sheet for insert cast molding include bonding sheets made of a resin based on chemically the same material as that of the monomer for cast molding, an acrylic resin, a polyvinyl alcohol resin, a cellulose resin, a polyurethane resin and the like. The bonding sheet is preferably a sheet made of a linear polymer because of its ease of impregnation with a monomer for cast molding.

The thickness of the bonding sheet is preferably from about 0.01 to 1.0 mm, and the bonding sheet is laminated and stuck to a retardation functional portion through an adhesive or a pressure-sensitive adhesive.

Herein, when the thickness of the bonding sheet is less than 0.01 mm, it is difficult to produce and also a heat bonding force is inferior. It is not preferred that the thickness is more than 1.0 mm since an appearance-related problem such as too thick polarization optical article may sometime arise.

It is necessary for the adhesive or pressure-sensitive adhesive, which is used to stick a bonding sheet and a retardation functional portion with each other, to have long-term durability against water, heat, light and the like. In case of an insert cast molding method, it is necessary that the resin does not dissolve in a monomer for cast molding.

Examples of the adhesive include a polyurethane resin, a polythiourethane resin, an epoxy resin, a vinyl acetate resin, an acrylic resin, a wax and the like. Examples of the pressure-sensitive adhesive include a vinyl acetate resin, an acrylic resin and the like.

In any case of an insert injection molding method and an insert cast molding method, it is preferred that a bonding sheet is not stretched since heat shrinkage does not occur in case of bonding or back-up injection molding and thus strain is less likely to be generated in the lens. Stabilizers such as an ultraviolet absorber and an antioxidant may be added to the bonding sheet.

The bonding sheet can also serve as a protective sheet of a retardation plate. Configuration examples of the laminated body with a bonding sheet in which a linear polarization functional portion, a retardation functional portion and a bonding sheet are stuck with each other in this order, to be used suitably in the present invention include:

(linear polarizer-retardation sheet-bonding sheet),
(linear polarizer-protective sheet-retardation sheet-bonding sheet),
(linear polarizer-protective sheet-retardation sheet-protective sheet-bonding sheet),
(linear polarizer-protective sheet-protective sheet-retardation sheet-bonding sheet),
(linear polarizer-protective sheet-protective sheet-retardation sheet-protective sheet-bonding sheet),
(protective sheet-linear polarizer-retardation sheet-bonding sheet), (protective sheet-linear polarizer-protective sheet-retardation sheet-bonding sheet),
(protective sheet-linear polarizer-protective sheet-retardation sheet-protective sheet-bonding sheet),
(protective sheet-linear polarizer-protective sheet-protective sheet-retardation sheet-bonding sheet), and
(protective sheet-linear polarizer-protective sheet-protective sheet-retardation sheet-protective sheet-bonding sheet)

Heat bondability of the retardation functional portion with the back-up resin portion produced by the insert injection molding method can be supplemented by a coating layer for heat-bonding provided at the retardation functional portion side.

Examples of the resin used in such a coating layer for heat-bonding include a polyurethane resin, a polythiourethane resin, an epoxy resin, a polyvinyl acetate resin, a polyacrylic resin, a polyester resin, a polyolefin resin, a synthetic rubber and the like.

The coating layer for heat-bonding is formed by uniformly applying a hot melt, a solution, an emulsion or the like of a resin, which is used as the coating layer for heat-bonding, to a heat bonding surface of the above-mentioned laminated body composed of a linear polarization functional portion and a retardation functional portion, or a heat bonding surface of a laminated body composed of a linear polarization functional portion, a retardation functional portion and a bonding sheet, or a retardation sheet, protective sheet or bonding sheet which serves as a heat bonding surface thereof, using a common coating method such as a gravure coating method or an offset coating method.

The thickness of the coating layer for heat-bonding is usually from 0.1 to 500 μm, and preferably from 0.5 to 400 μm. When the thickness of the coating layer for heat-bonding is less than 0.1 μm, an adhesion force is low. When the thickness is more than 500 μm, the coating layer for heat-bonding may ooze or protrude from the end surface of a polarization optical article in case of insert injection molding of a back-up resin.

Description of Bending

It is preferred that the above-mentioned laminated body composed of a linear polarization functional portion and a retardation functional portion, or the laminated body with a bonding sheet composed of a linear polarization functional portion, a retardation functional portion and a bonding sheet is formed into a bent body by forming into a lens through bending. Examples of the shape of the bent body include a spherical surface shape, an elliptical surface shape, toric shape and the like.

There is no particular limitation on the bending method, including the method as disclosed in JP-A 1-22538. Usually, bending is performed so that the objective side, namely a linear polarization functional portion corresponds to a convex surface, while the ocular side, namely a retardation functional portion, or a bonding sheet corresponds to a concave surface.

Description of Back-Up Resin Portion

As mentioned above, examples of the method for forming a back-up resin portion include an insert injection molding method, an insert cast molding method, and a sticking method (a sticking method of a flat plate and a sticking method of a lens-shaped plastic solid).

Description of Back-Up Resin Portion to be Molded by Insert Injection Molding Method The insert injection molding method is a method in which the above-mentioned bent body is inserted in a mold of an injection molding machine and then a resin to be backuped to a retardation functional portion at a concave surface side or a bonding sheet is injection-molded.

From the viewpoint of high productivity and precision of a plastic solid, the insert injection molding method disclosed in JP-A 11-245259 is basically preferable.

Namely, it is a method in which a bent body is placed in a mold so as to heat-bond a back-up resin portion at concave surface side of the above bent body, and a back-up resin is insert-injection molded.

The back-up resin to be used in the insert injection molding method is preferably a transparency resin which has satisfactory heat bondability with the concave surface side of the bent body, and also has high hardness, bending rigidity and impact resistance.

Examples of typical resin include a polycarbonate resin, a polyamide resin, a polyester resin, a polyurethane resin, a polyacrylic resin, a polycycloolefin resin, a polystyrene resin, a polyvinyl chloride resin, a polystyrene•methyl methacrylate resin, a polyacrylonitrile•styrene resin, a poly-4-methylpentene-1 resin, an acylcellulose resin containing a plasticizer added therein and the like.

Stabilizers such as an ultraviolet absorber and an antioxidant are often added to these resins.

From the viewpoint of high transparency, heat resistance, physical strength and ease of injection molding, a polycarbonate resin, a polyamide resin, a polyester resin, a polyurethane resin, a polyacrylic resin and a polycycloolefin resin are particularly preferable.

The polycarbonate resin is preferably an aromatic polycarbonate resin composed mainly of aromatic phenols such as bisphenol A, and a polymer alloy of an aromatic polycarbonate resin and a polyester resin, from the viewpoint of increasing the physical strength of the linear polarizing plate.

Among these polycarbonate resins, a bisphenol A-based polycarbonate resin is preferable, and a resin having a viscosity average molecular weight of 15,000 or more, and preferably 18,000 or more, is excellent in strength and toughness of the polarizing plate.

The polyamide resin is preferably a polyamide resin which has high hardness and strength as well as strong toughness, and is amorphous and also has high transparency, among polyamides obtained by polycondensing an alicyclic or aliphatic dicarboxylic acid and an alicyclic or aliphatic diamine as main components.

Because of necessity of particularly high transparency, a polyamide called an amorphous nylon or transparent nylon is preferably used. Typical examples thereof include "GRILAMID" TR-55 and "GRILAMID" TR-90 manufactured by EMS CHMEMIE Holding, "TROGAMID" CX-7323 manufactured by HULS and the like. The transparent nylon commonly has a feature such as lesser orientation optical strain due to birefringence as compared with the polycarbonate resin. The transparent nylon may also have higher solvent resistance such as solvent crack resistance as compared with the polycarbonate resin.

A polyester resin having high hardness and strength, strong toughness and excellent transparency is preferably used among polyester resins containing, as a main component, an aromatic dicarboxylic acid such as terephthalic acid.

A polyurethane resin which has high hardness, strength and strong toughness, and is less likely to cause crystallization, is preferably used among polyurethane resins containing, as a diisocyanate component, an aromatic diisocyanate or an alicyclic diisocyanate.

Examples of preferable polyurethane resin include polyester-based polyurethanes "ELASTOLLAN" ET590, "ELASTOLLAN" ET595 and "ELASTOLLAN" ET598 manufactured by BASF, and polyether-based polyurethanes manufactured by the same company.

As the polyacrylic resin, methacrylate-based polymers such as methyl methacrylate and cyclohexyl methacrylate, and an acrylic resin including a copolymer are preferably exemplified from the viewpoint of hardness, strength and transparency.

The polycycloolefin resin generally has a feature such as small birefringence, and it is easy to obtain a sheet with less optical strain. Typical examples of the cycloolefin resin (and the cycloolefin copolymerized resin) include "ZEONEX" and "ZEONOR" of Zeon Corporation, "ARTON" of JSR Corporation, "OPTOREZ" of Hitachi Kasei Polymer Co., Ltd., "APEL" of Mitsui Chemicals, Inc., and "ESSINA" of Sekisui Chemical Company, Limited.

According to the insert injection molding method, a polarized plano lens and a polarized semilens in which the thickness of a back-up resin portion is almost the same over the whole area of the polarizing lens, and a polarized correcting lens in which the thickness of a back-up resin portion varies depending on a site of the lens is produced. Since the polarized semilens is used in a state where a back-up resin portion is polished, the lens is thicker than the polarized plano lens.

In the polarized plano lens, it is recommended that a center thickness of the lens after molding the back-up resin portion is from about 0.7 to 3 mm, and preferably from 0.8 to 2.8 mm. When the center thickness is less than 0.7 mm, it may be difficult to perform insert injection molding and to obtain sufficient impact strength. It is not preferred that the center thickness is more than 3 mm since an appearance-related problem such as too thick polarization optical article may sometime arise.

As the thickness of a polarized plano lens increases, a minus side refracting power is imparted to sight line passing through the lens end, and thus visual artifacts may occur. To cope with such a problem, a minus side refracting power generated in a polarized plano lens is preferably cancelled by imparting a slightly plus side refracting power by a method in which the thickness is gradually decreased toward the lens end by optical design of shifting the center between a front curve (a lens curve at the objective side) and a back curve (a lens curve at the ocular side) or changing a curvature radius.

In case of a polarized correcting lens, lens strength is likely to decrease in minus diopter in which lens center becomes thin, although it varies depending on the lens diopter. Therefore, it is necessary that the thickness of the lens center of the polarized correcting lens is at least 0.3 mm. When the thickness of the lens center is less than 0.3 mm, impact strength of the lens decreases and thus the fracture or formation of pores may be often caused by impact of the lens.

In case of a polarized semilens, the back-up resin portion is polished according to the correction diopter.

Description of Back-Up Resin Portion by Insert Cast Molding Method

Typical insert cast molding method is a method in which a liquid monomer is filled into a glass mold into which a bent body is inserted, and then a back-up resin is subjected to thermal polymerization or electromagnetic radiation polymerization at a concave surface side of a bent body.

Examples of the monomer to be used include monomers for thiourethane-based lens, such as CR39 (diethylene glycol diallyl carbonate) manufactured by Mitsui Chemicals, Inc.; monomers for episulphide-based lens, such as a monomer Mitsubishi Gas Chemical Company, Inc; (meth)acrylates composed mainly of methyl methacrylate and urethane acrylate; aromatic polyisocyanates such as tolylene diisocyanate (TDI), metaxylene diisocyanate (MDI) and diphenylmethane-4,4'-diisocyanate; and mixtures of isocyanate compounds for polyurethane, for example, aliphatic polyisocyanates such as hexamethylene diisocyanate and isophorone diisocyanate with polyol compounds for polyurethane, for example, aliphatic glycols such as ethylene glycol and 1,3-propane glycol, polyether-based glycols such as polyethylene glycol and polypropylene glycol, and polyester-based glycols such as caprolactone-based and adipate-based glycols.

Stabilizers such as an ultraviolet absorber and an antioxidant may be added to these monomers.

In case of producing a polarized plano lens by an insert cast molding method, the lens thickness is almost the same as that of the above-mentioned polarized plano lens by the insert injection molding method. In case of producing a polarized correcting lens by an insert cast molding method, the lens thickness is almost the same as that of the above-mentioned polarized correcting lens by the insert injection molding method. Also, in case of an insert cast molding method, a polarized semilens is produced.

Description of Back-Up Resin Portion by Sticking Method

As mentioned above, the method for producing a back-up resin portion using a sticking method include two methods such as a sticking method of a flat plate and a sticking method of a lens-shaped plastic solid.

The sticking method of a flat plate is a method in which a back-up resin is formed into a sheet in advance by extrusion molding or cast molding, and then a lens-shaped plastic solid is produced by bonding, and the lens-shaped plastic solid is stuck to the above-mentioned bent body using an adhesive or a pressure-sensitive adhesive.

The sticking method of a lens-shaped plastic solid is a method in which a lens-shaped plastic solid is directly produced by injection molding or cast molding of a back-up resin, and then the lens-shaped plastic solid is stuck to the above-mentioned bent body using an adhesive or a pressure-sensitive adhesive.

The thermoplastic resin suited for the sticking method is almost the same as the resin suited for the above-mentioned insert injection molding method.

The monomer for cast molding suited for the sticking method is almost the same as the monomer suited for the above-mentioned insert injection molding method.

The sheet of the sticking method of a flat plate is formed into a lens-shaped plastic solid by bending using the same method as in case of forming a laminated body into a bent body. It is preferred that the shape and curve of the lens of a lens-shaped plastic solid are almost the same as those of the bent body to be stuck.

The bent body and the lens-shaped plastic solid are stuck using an adhesive or pressure-sensitive adhesive in a state where the concave side of the lens-shaped plastic solid is laid on the concave surface side of the bent body.

It is necessary for an adhesive or a pressure-sensitive adhesive used for sticking to have long-term durability against water, heat, light and the like.

Examples of the adhesive include a polyurethane resin, a polythiourethane resin, an epoxy resin, a vinyl acetate resin, an acrylic resin, a wax and the like. Examples of the pressure-sensitive adhesive include a vinyl acetate resin, an acrylic resin and the like.

The thickness of the lens in case of producing a polarized plano lens by the sticking method is almost the same as that in the above-mentioned polarized plano lens produced by the insert injection molding method. The thickness of the lens in case of producing a polarized correcting lens is almost the same as that in the above-mentioned polarized correcting lens produced by the insert injection molding method.

Description of High Processing of Polarization Optical Article in which Uneven Polarization Coloring has been Improved In the polarization optical article typified by the polarizing lens of the present invention, a surface thereof can be subjected to hard coat processing. The hard coat is generally a thermosetting hard coat such as a silane-based or epoxy-based hard coat; or an electromagnetic radiation curing hard coat such as an acrylic-based or epoxy-based hard coat.

The hard coat is usually formed in a film thickness of about 0.5 to 15 μm. For the purpose of improving adhesion and impact resistance, a polyacrylate-based primer coat layer or polyurethane-based primer coat layer is provide on a lens surface, and hard coat layer primer is provided on a coat layer.

The polarization optical article of the present invention can be subjected to anti-reflection processing, metallic processing, anti-fogging processing and anti-fouling processing.

EXAMPLES

Example 1

A sheet of polyvinyl alcohol, dyed with a dichroic dye, was stretched with a ratio of 4.3 times in a uniaxial direction to prepare a polyvinyl alcohol linear polarizer having a thickness of about 30 μm and a polarization degree of 98%.

As a protective sheet of a linear polarizer, a polycarbonate resin having a viscosity average molecular weight of about 25,000 was subjected to extrusion molding and then stretched with a ratio of 2 times in a uniaxial direction to prepare a 0.2 mm thick polycarbonate protective sheet.

On one surface of the polycarbonate protective sheet, a urethane-based adhesive was applied in a thickness of about μm. In a state where a stretching direction of the polycarbonate protective sheet and a stretching direction of the polyvinyl alcohol linear polarizer are unified, both were stuck with each other to prepare a linear polarization functional portion in which one surface is made of a polycarbonate protective sheet and the other surface is made of a polyvinyl alcohol linear polarizer.

As the retardation functional portion, a polycarbonate resin having a viscosity average molecular weight of about 20,000 was formed into a sheet by extrusion molding, and then stretched with a ratio of 2.4 times in a uniaxial direction to prepare a polycarbonate retardation sheet having a thickness of 0.1 mm, and a retardation value of 6,600 nm measured at a wavelength 589 nm.

Then, a urethane-based adhesive was applied on the polycarbonate retardation sheet in a thickness of about 10 μm.

Then, an angle of 45° was formed between a stretching direction of the polyvinyl alcohol linear polarizer and a stretching direction of the polycarbonate retardation sheet, and the polyvinyl alcohol linear polarizer and the polycarbonate retardation sheet were stuck to prepare a laminated body composed of a linear polarization functional portion and retardation functional portion. The laminated body was stamped out by a punching machine to prepare a circular laminated body.

Then, the circular laminated body was bent so that the linear polarization functional portion serves as a convex surface, and the retardation functional portion serves as a concave surface to prepare a bent body having a curvature radius of about 87 mm.

The convex side (linear polarization functional portion side) of the bent body was set in the concave mold of an insert injection molding machine, to which a circular mold having 6C (curve), namely a curvature radius of 87 mm was attached, and then a polycarbonate resin (having a viscosity average molecular weight of 25,000) was insert-injection molded into the concave surface side (retardation functional portion side) to form a back-up resin portion.

The obtained product is a polarized plano lens in which uneven polarization coloring has been improved, and has a diameter of about 86 mm and a spherical surface of 6C, and a thickness of a back-up portion was 1.3 mm.

The evaluation results of uneven polarization coloring are shown in Table 1.

Example 2

Three retardation sheets (each having a retardation value of 6,600 nm) prepared in Example 1 were laid one upon another in the same stretching direction, and then stuck with each other using a urethane-based adhesive (a thickness of the adhesive between the respective retardation sheets is about 10 μm) to prepare a retardation functional portion composed of a three-layered retardation sheet. The retardation value of the retardation functional portion is calculated as 19,800 nm in accordance with the above-mentioned formula (2).

The retardation functional portion was stuck to the linear polarization functional portion prepared in Example 1 in the same manner as in Example 1 to prepare a laminated body composed of a linear polarization functional portion and a retardation functional portion. In the same manner as in Example 1, the laminated body was stamped out by a punching machine to prepare a circular laminated body.

The obtained circular laminated body was bent in the same manner as in Example 1 to prepare a bent body. A back-up resin was insert-injection molded to the retardation functional portion side of the bent body in the same manner as in Example 1.

The obtained product is a polarized plano lens in which uneven polarization coloring has been improved, and has a diameter of about 86 mm and a spherical surface of 6C, and a thickness of a back-up portion was 1.3 mm.

The evaluation results of uneven polarization coloring are shown in Table 1.

Example 3

Eight retardation sheets (each having a retardation value of 6,600 nm) prepared in Example 1 were laid one upon another in the same stretching direction, and then stuck with each other using a urethane-based adhesive (a thickness of the adhesive between the respective retardation sheets is about 10 μm) to prepare a retardation functional portion composed of an eight-layered retardation sheet. The retardation value of the retardation functional portion is calculated as 52,800 nm in accordance with the above-mentioned formula (2).

The retardation functional portion was stuck to the linear polarization functional portion prepared in Example 1 in the same manner as in Example 1 to prepare a laminated body composed of a linear polarization functional portion and a retardation functional portion. In the same manner as in Example 1, the laminated body was stamped out by a punching machine to prepare a circular laminated body.

The obtained circular laminated body was bent in the same manner as in Example 1 to prepare a bent body. A back-up resin was insert-injection molded to the retardation functional portion side of the bent body in the same manner as in Example 1.

The obtained product is a polarized plano lens in which uneven polarization coloring has been improved, and has a diameter of about 86 mm and a spherical surface of 6C, and a thickness of a back-up portion was 1.3 mm.

The evaluation results of uneven polarization coloring are shown in Table 1 and Table 2.

Example 4

A 0.2 mm thick extrusion-molded non-stretched polymethyl methacrylate sheet is used as a bonding sheet.

A urethane-based adhesive was applied to the bonding sheet in a thickness of about 25 μm. The bonding sheet was stuck to a retardation functional portion side of the laminated body prepared in Example 3 to prepare a laminated body with a bonding sheet. The obtained laminated body with a bonding sheet is a laminated body in which a linear polarization functional portion, a retardation functional portion and a bonding sheet are laminated in this order. In the same manner as in Example 1, the laminated body was stamped out by a punching machine to prepare a laminated body with a circular bonding sheet.

The obtained laminated body with a circular bonding sheet was bent in the same manner as in Example 1 to prepare a bent body having a curvature radius of about 87 mm in which a linear polarization functional portion serves as a convex surface and a bonding sheet serves as a concave surface.

The convex side (linear polarization functional portion side) of the bent body was set in the concave mold of an insert injection molding machine, to which a mold having 6C (curve), namely a curvature radius of 87 mm was attached, and then a polymethyl methacrylate resin was insert-injection molded into the concave surface side (bonding sheet side) to form a back-up resin portion.

The obtained product is a polarized plano lens in which uneven polarization coloring has been improved, and has a diameter of about 86 mm and a spherical surface of 6C, and a thickness of a back-up portion was 1.1 mm.

The evaluation results of uneven polarization coloring are shown in Table 1 and Table 2.

Example 5

CR39 monomer was filled between two glass plates and then cast molding between plates was performed to prepare a 0.3 mm thick CR39 sheet. This sheet is used as a bonding sheet.

A urethane-based adhesive was applied to the bonding sheet in a thickness of about 25 μm. The bonding sheet was stuck to a retardation functional portion side of the laminated body prepared in Example 3 to prepare a laminated body with a bonding sheet. The obtained laminated body with a bonding sheet is a laminated body in which a linear polarization functional portion, a retardation functional portion and a bonding sheet are laminated in this order. In the same manner as in Example 1, the laminated body was stamped out by a punching machine to prepare a laminated body with a circular bonding sheet.

The obtained laminated body with a circular bonding sheet was bent in the same manner as in Example 1 to prepare a bent body having a curvature radius of about 87 mm in which a linear polarization functional portion serves as a convex surface and a bonding sheet serves as a concave surface.

In order to perform insert cast molding, a pair of circular glass molds having 6C (curve), namely a curvature radius of 87 mm were prepared. Namely, they are a concave-shaped glass mold for molding a convex side of the lens (referred to as a mold A) and a convex-shaped glass mold for molding a concave side of the lens (referred to as a mold B).

One droplet of a CR39 monomer containing a polymerization initiator was dropped on the convex surface of the mold A, and the concave side of the bent body was pressed against the convex surface, and then the concave surface of the mold A was stuck in close contact with the convex surface of the bent body, utilizing a surface tension of the CR39 monomer to prepare a sticker body of the mold A and the bent body.

Then, the convex side of the mold B was oppositely arranged on the concave surface side of the sticker body. Then, the peripheries of both molds A and B were fixed and sealed with a gasket tape. A CR39 monomer containing a polymerization initiator was filled into the thus formed sealed space. Then, the back-up resin portion was insert-cast molded by thermal polymerization.

After cast molding, the glass mold was removed to obtain a polarized plano lens in which uneven polarization coloring has been improved. The obtained lens had a diameter of about 86 mm and a spherical surface of 6C, and a thickness of a back-up portion was 11 mm.

The evaluation results of uneven polarization coloring are shown in Table 1 and Table 2.

Example 6

Using the glass for plano lens molding of 6C used in Example 5 and a CR39 monomer, a lens-shaped plastic solid made of CR39 was cast-molded. The obtained lens-shaped plastic solid made of CR39 was a 1 mm thick plano lens.

A urethane-based adhesive was spin-coated onto a convex surface of the lens-shaped plastic solid to form an adhesive layer having a thickness of about 30 μm. The concave surface side of the bent body prepared in Example 5 was laid on the surface coated with the urethane-based adhesive of the lens-shaped plastic solid, followed by sticking. The obtained product was a polarized plano lens in which uneven polarization coloring has been improved, the lens including the lens-shaped plastic solid as the back-up resin portion and having a diameter of about 86 mm.

The evaluation results of uneven polarization coloring are shown in Table 1 and Table 2.

Comparative Example 1

A polycarbonate resin having a viscosity average molecular weight of about 20,000 was formed into a sheet by extrusion molding and then the obtained sheet was stretched with a ratio of 1.4 times in a uniaxial direction to prepare a polycarbonate retardation sheet having a thickness of 0.1 mm and a retardation value of 700 nm measured at a wavelength of 589 nm.

In the same manner as in Example 1, except that the polycarbonate retardation sheet was used in place of the retardation sheet having a retardation value of 6,600 nm used in Example 1, a polarizing lens having a diameter of about 86 mm, a spherical surface of 6C and a thickness of the back-up portion of 1.3 mm was prepared.

The evaluation results of uneven polarization coloring are shown in Table 1.

Comparative Example 2

In the same manner as in Example 1, except that an angle of 18° was formed between a stretching direction of a polyvinyl alcohol linear polarizer and a stretching direction of a polycarbonate retardation sheet in Example 1, a polarizing lens having a diameter of about 86 mm, a spherical surface of 6C and a thickness of the back-up portion of 1.3 mm was prepared.

The evaluation results of uneven polarization coloring are shown in Table 1.

Comparative Example 3

In the same manner as in Example 5, except that the retardation functional portion was not included, a laminated body with a bonding sheet was prepared. In the same manner as in Example 5, 0.3 mm thick bonding sheet made of CR39 prepared by cast molding between plates in Example 5 was stuck to the polyvinyl alcohol linear polarizer prepared in Example 1.

In the same manner as in Example 5, the laminated body with a bonding sheet, including no retardation functional portion was insert-cast molded to prepare a polarized plano lens made of CR39, having a diameter of about 86 mm, a spherical surface of 6C and a thickness of the back-up portion of 1 mm.

The evaluation results of uneven polarization coloring are shown in Table 1 and Table 2.

TABLE 1

Observation results of uneven polarization coloring of polarizing lens

| Polarizing lens | Light source | |
| --- | --- | --- |
| | Sunlight | Fluorescent desk lamp |
| Example 1 | A | C |
| Example 2 | A | B |
| Example 3 | A | A |
| Example 4 | A | A |
| Example 5 | A | A |
| Example 6 | A | A |
| Comparative Example 1 | C | C |
| Comparative Example 2 | C | C |
| Comparative Example 3 | A | A |

Method for Observation of Uneven Polarization Coloring:

The polyvinyl alcohol linear polarizer prepared in Example 1 is laid on a back-up resin portion side of a polarizing lens, and then uneven polarization coloring of transmitted light is observed in a crossed nicols state (transmission axis is in an orthogonal state) with a linear polarizer of a polarizing lens. After breaking the crossed nicols state, an angle of the transmission axis is variously changed and uneven polarization coloring of transmitted light is observed.

Criteria:

A: uneven polarization coloring is not observed or scarcely observed.

B: uneven polarization coloring is observed to the extent enough so that one may not find them overly objectionable.

C: uneven polarization coloring is slightly observed.

D: Remarkable uneven polarization coloring is observed.

TABLE 2

Observation results of uneven polarization coloring of polarizing lens mounted in frame

| Polarizing lens | Light source | |
| --- | --- | --- |
| | Sunlight | Fluorescent desk lamp |
| Example 3 | A | A |
| Example 4 | A | A |
| Example 5 | A | A |
| Example 6 | A | A |
| Comparative Example 3 | C | C |

Method for Mounting in Frame:

Using an ordinary lens coarse polishing machine, coarse polishing of a polarizing lens is performed and then mounted in a frame made of titanium.

Method for observation of uneven polarization coloring: the same as in Table 1.

Criteria: the same as in Table 1.

What is claimed is:

1. A polarization optical lens for eyeglasses in which uneven coloring by polarization color has been improved, the polarization optical lens for eyeglasses being a multi-layered polarization optical lens for eyeglasses comprising:
    a linear polarization functional portion;
    a retardation functional portion; and
    a back-up resin portion,
    wherein, in the following order, the linear polarization functional portion, the retardation functional portion and the back-up resin portion are arranged starting from an objective side of the polarization optical lens for eyeglasses toward an ocular side of the polarization optical lens for eyeglasses,
    wherein the retardation functional portion has a retardation of 1,000 nm or more, and
    wherein the linear polarization functional portion and the retardation functional portion are arranged so that an absorption axis direction of the linear polarization functional portion and a delayed phase axis direction of the retardation functional portion form an angle of 45°±20° or less.

2. The polarization optical lens for eyeglasses in which uneven coloring by polarization color has been improved according to claim 1, wherein the linear polarization functional portion is a linear polarizer.

3. The polarization optical lens for eyeglasses in which uneven coloring by polarization color has been improved according to claim 1, wherein the linear polarization functional portion is a multi-layered polarizing plate composed of a linear polarizer and a linear polarizer protective functional portion.

4. The polarization optical lens for eyeglasses in which uneven coloring by polarization color has been improved according to claim 3, wherein the protective functional portion of the ocular side of the polarizing plate is a retardation functional portion.

5. The polarization optical lens for eyeglasses in which uneven coloring by polarization color has been improved according to claim 1, wherein the retardation functional portion is a retardation sheet.

6. The polarization optical lens for eyeglasses in which uneven coloring by polarization color has been improved according to claim 1, wherein the retardation functional portion is a multi-layered retardation plate composed of a retardation sheet and a retardation sheet protective functional portion.

7. A polarization optical lens for eyeglasses in which uneven coloring by polarization color has been improved, the polarization optical lens for eyeglasses comprising:
a laminated body including a linear polarization functional portion and a retardation functional portion; and
a back-up resin portion,
wherein the back-up resin portion is bonded to a retardation function side of the laminated body,
wherein the retardation functional portion has a retardation of 1,000 nm or more, and
wherein the linear polarization functional portion and the retardation functional portion are arranged so that an absorption axis direction of the linear polarization functional portion and a delayed phase axis direction of the retardation functional portion form an angle of 45°±20° or less.

8. A polarization optical lens for eyeglasses in which uneven coloring by polarization color has been improved, the polarization optical lens for eyeglasses comprising:
a laminated body including a linear polarization functional portion, a retardation functional portion and a bonding sheet, wherein, in the following order, the linear polarization functional portion, the retardation functional portion and the bonding sheet form the laminated body starting from an objective side of the laminated body toward an ocular side of the laminated body; and
a back-up resin portion bonded to a bonding sheet side of the laminated body,
wherein the retardation functional portion has a retardation of 1,000 nm or more, and
wherein the linear polarization functional portion and the retardation functional portion are arranged so that an absorption axis direction of the linear polarization functional portion and a delayed phase axis direction of the retardation functional portion form an angle of 45°±20° or less.

9. The polarization optical lens for eyeglasses in which uneven coloring by polarization color has been improved according to claim 1, wherein the back-up resin portion is subjected to insert injection molding or insert cast molding.

10. The polarization optical lens for eyeglasses in which uneven coloring by polarization color has been improved according to claim 1, wherein the back-up resin portion is a lens-shaped plastic solid produced by bending an extrusion molded sheet or a cast molded sheet, or is a lens-shaped plastic solid produced by injection molding or cast molding.

11. The polarization optical lens for eyeglasses in which uneven coloring by polarization color has been improved according to claim 7, wherein the back-up resin portion is adhesive-bonded or heat-bonded to the retardation function side or a bonding sheet side of the laminated body.

12. The polarization optical lens for eyeglasses in which uneven coloring by polarization color has been improved according to claim 1, wherein the back-up resin portion is any one of a polycarbonate resin, a polyamide resin, a polyester resin, a polyacrylic resin, a polycycloolefin resin and a polyurethane resin.

13. The polarization optical lens for eyeglasses in which uneven coloring by polarization color has been improved according to claim 1, wherein the back-up resin portion is an insert-injection molded polycarbonate resin or a lens-shaped plastic solid made of polycarbonate, and the retardation functional portion has a retardation of 8,000 nm or more.

14. The polarization optical lens for eyeglasses in which uneven coloring by polarization color has been improved according to claim 1, wherein the back-up resin portion is an insert-cast molded or cast-molded diethylene glycol diallyl carbonate resin (CR39), thiourethane resin, episulphide resin, polyurethane resin or acrylic resin.

* * * * *